F. A. BELTRAN.
POOL GAME.
APPLICATION FILED SEPT. 21, 1910.

984,463. Patented Feb. 14, 1911.

F. A. BELTRAN.
POOL GAME.
APPLICATION FILED SEPT. 21, 1910.

984,463.

Patented Feb. 14, 1911.
2 SHEETS—SHEET 2.

Witnesses
W. C. Smith
B. G. Richards

Inventor
Francis A. Beltran
by Joshua R. H. Potts
his Attorney

UNITED STATES PATENT OFFICE.

FRANCIS A. BELTRAN, OF CHICAGO, ILLINOIS.

POOL GAME.

984,463.  Specification of Letters Patent.  Patented Feb. 14, 1911.

Application filed September 21, 1910.  Serial No. 583,141.

*To all whom it may concern:*

Be it known that I, FRANCIS A. BELTRAN, a citizen of the United States of Mexico, and a resident of the city of Chicago, county of Cook, and State of Illinois, have invented certain new and useful Improvements in Pool Games, of which the following is a specification.

My invention relates to improvements in pool games and has for its object the provision of an improved pool game of great interest.

My invention consists in the combination and arrangement of parts hereinafter described.

Figure 1:
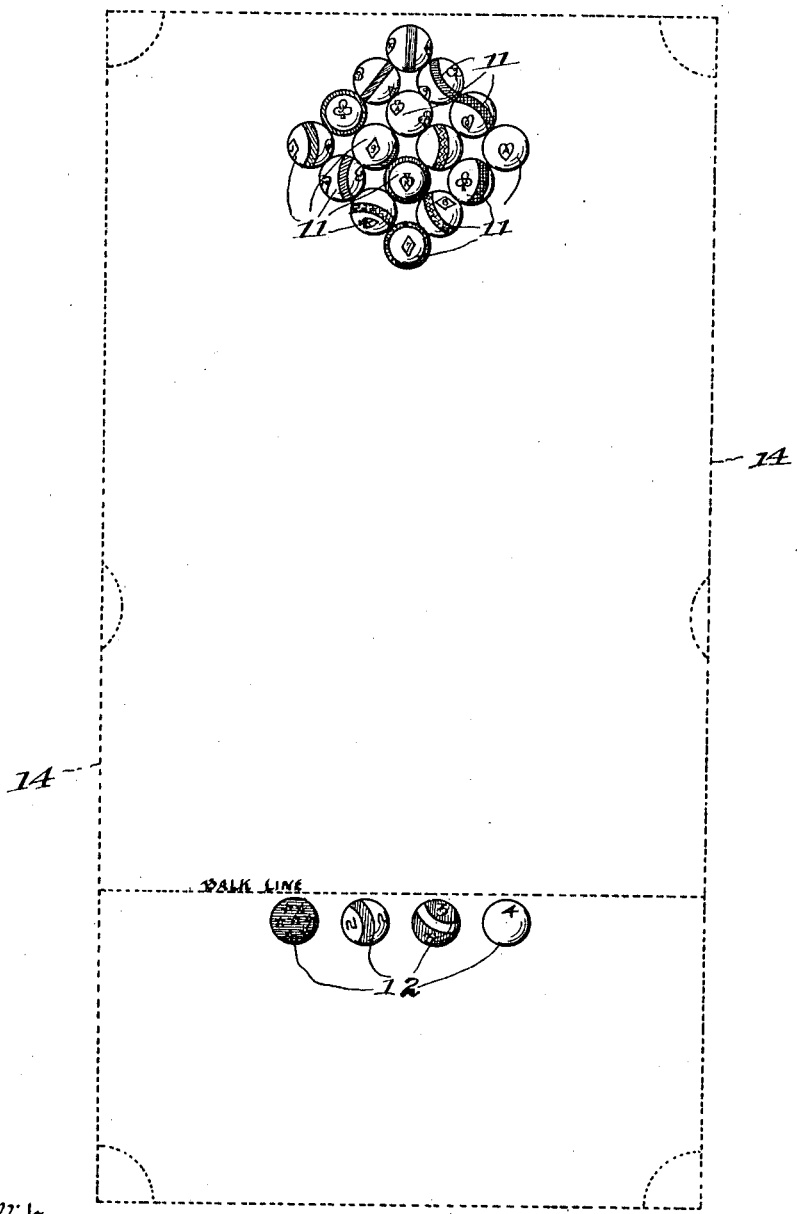

My invention will be best understood by reference to the accompanying drawings forming a part of this specification and in which, Figure 1 is a diagrammatic view of a pool table showing pool balls in position for playing in the game, Figs. 2 to 21 inclusive each show opposite elevations of the balls employed in the game, and Figs. 22 to 33 inclusive illustrate the form of counters employed in the game.

Figure 2:
Figure 4:
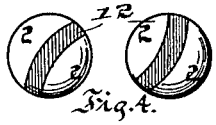
Figure 3:
Figure 5:
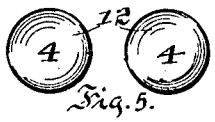
Figures 22, 23:
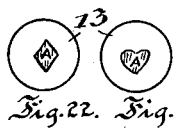
Figure 6:
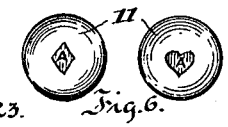
Figure 14:
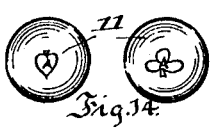
Figures 28, 29:
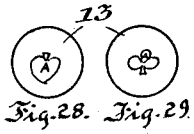
Figures 24, 25:
Figure 7:
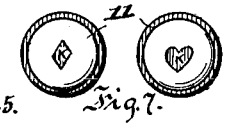
Figure 15:
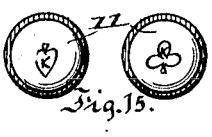
Figures 30, 31:
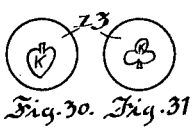
Figures 26, 27:
Figure 8:
Figure 16:
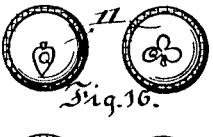
Figures 32, 33:
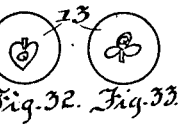
Figure 9:
Figure 17:
Figure 10:
Figure 18:
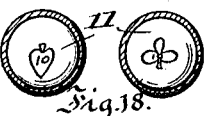
Figure 11:
Figure 19:
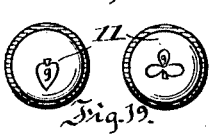
Figure 12:
Figure 20:
Figure 13:
Figure 21:

The preferred form of game comprises sixteen object balls 11, each of said object balls being provided on opposite sides with marks indicative of corresponding playing cards in different suits of the same color and including the cards in the several suits from the ace to the seven. Thus one ball as illustrated in Fig. 6 is provided on opposite sides with the representations of an ace of diamonds and an ace of hearts. Another ball is similarly provided with marks indicative of the king of diamonds and king of hearts as illustrated in Fig. 7 and so on for each of the corresponding cards in the diamond and heart suits down to and inclusive of the seven as shown in Figs. 8 to 13 inclusive. The spade and club suits are similarly indicated on the balls illustrated in Figs. 14 to 21. This provides sixteen object balls each provided on its opposite sides with marks indicative of the corresponding cards in the card suits of the same color. These balls may also be provided with differently colored bands or other marks to assist in distinguishing them from each other. Four cue balls 12 are also provided for use of the players. These cue balls are all differently marked as shown, one being marked with white stars on a blue back-ground, as shown in Fig. 2, another with a white medial circumferential band on a red back-ground as shown in Fig. 3, another with a red medial circumferential band on a white back-ground as shown in Fig. 4, and the fourth a plain white ball as shown in Fig. 5. These cue balls may also be provided with different numbers to further distinguish them. A set of counters 13 is also provided to correspond with each of the cards indicated on the object balls. These counters consist of disks 13 marked to indicate the different cards, there being thirty-two in all. Or the corresponding cards from an ordinary deck of playing cards may be used in place of these counters.

In playing the game the object balls 11 are arranged on the pool table 14 in any suitable manner and each of the players selects and uses one of the cue balls in shooting the different object balls into the pockets as in the ordinary game of pool. Before commencing play, each player draws or is dealt five of the counters used. From these counters the player then selects such as he wishes to retain with the view of completing a poker hand of high value from object balls which he may afterward be able to pocket or otherwise acquire under the rules of the game. Each of the object balls pocketed or acquired may count for either of the cards indicated thereon at the option of the acquiring player.

Various playing rules and restrictions may be placed upon the players as to the method of acquiring different object balls thus lending great variety and interest to the game. The winner of the game is the player having counters and object balls indicative of cards making up the highest poker hand at the end of the game.

While I have illustrated and described the preferred form of construction for carrying my invention into effect this is capable of variation or modification without departing from the spirit of the invention. I, therefore, do not wish to be limited to the exact details set forth, but desire to avail myself of such variations and modifications as come within the scope of the claims.

Having described my invention what I deem as new and desire to secure by Letters Patent is:

1. In a pool game, the combination of a set of object balls each provided with marks indicative of two playing cards; and a set of counters indicative of corresponding playing cards, substantially as described.

2. In a pool game, the combination of a set of object balls each provided with marks indicative of the corresponding cards in two different suits of playing cards; and a set of counters indicative of corresponding playing cards, substantially as described.

3. In a pool game, the combination of a set of object balls each provided with marks indicative of the corresponding cards in two different suits of playing cards; and a set of counters indicative of corresponding playing cards; and differently marked cue balls for the players, substantially as described.

4. In a pool game, the combination with a pool table, of a set of sixteen object balls each provided on its opposite sides with marks indicative of the corresponding cards in the card suits of the same color, said balls being marked to correspond with the suit cards from the ace to the seven inclusive; four differently marked cue balls; and a set of counters indicative of the playing cards corresponding to the cards indicated by said object balls, substantially as described.

In testimony whereof I have signed my name to this specification in the presence of two subscribing witnesses.

FRANCIS A. BELTRAN.

Witnesses:
FERNANDO SESSANO,
HERBERT TARNO.